United States Patent
Cardona et al.

(10) Patent No.: US 11,661,072 B1
(45) Date of Patent: May 30, 2023

(54) SYSTEMS AND METHODS OF DETERMINING EFFECTIVENESS OF VEHICLE SAFETY FEATURES

(71) Applicant: STATE FARM MUTUAL AUTOMOBILE INSURANCE COMPANY, Bloomington, IL (US)

(72) Inventors: Alexander Cardona, Bloomington, IL (US); Tim G. Sanidas, Bloomington, IL (US); Jaime Skaggs, Chenoa, IL (US); Pamela Rearden, Bloomington, IL (US); Timothy J. Nickel, Bloomington, IL (US); Thomas Hilton Jannusch, McLean, IL (US); James P. Rodriguez, Avondale, AZ (US); Scott T. Christensen, Salem, OR (US); Karthikeyan Srinivasan, Phoenix, AZ (US); David Dohrmann, Mesa, AZ (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 404 days.

(21) Appl. No.: 16/928,793

(22) Filed: Jul. 14, 2020

Related U.S. Application Data

(60) Provisional application No. 62/935,890, filed on Nov. 15, 2019, provisional application No. 62/905,742,
(Continued)

(51) Int. Cl.
*B60W 50/00* (2006.01)
*G07C 5/02* (2006.01)
(Continued)

(52) U.S. Cl.
CPC ......... *B60W 50/0098* (2013.01); *G06N 20/00* (2019.01); *G06Q 40/08* (2013.01);
(Continued)

(58) Field of Classification Search
CPC ..... B60W 50/0098; B60W 2050/0083; B60W 2556/55; G06N 20/00; G06Q 40/08; G07C 5/02
(Continued)

(56) References Cited

U.S. PATENT DOCUMENTS

| 9,311,271 | B2 | 4/2016 | Wright |
| 9,633,487 | B2 | 4/2017 | Wright |

(Continued)

FOREIGN PATENT DOCUMENTS

WO  WO-2015132582 A2 *  9/2015  ......... G06F 17/2276

OTHER PUBLICATIONS

Non-Final Office Action, U.S. Appl. No. 17/941,096, dated Feb. 16, 2023.

*Primary Examiner* — Isaac G Smith
(74) *Attorney, Agent, or Firm* — Marshall, Gerstein & Borun LLP

(57) ABSTRACT

Systems and methods for determining the effectiveness of vehicle safety features are provided. Vehicle build information (VBI) for vehicles manufactured by a plurality of OEMs may be obtained. The VBI may contain OEM-specific terminology for smart safety features associated with each vehicle. The obtained VBI may be analyzed to generate an ontology model mapping each feature to any OEM-specific terminology associated with the feature. The ontology model may be applied to the VBI to generate translated VBI for each vehicle, such that the OEM-specific terminology associated with each feature is replaced with OEM-agnostic terminology for the feature. Vehicle accident record infor-
(Continued)

mation may be obtained for each vehicle, including, e.g., the number, frequency, severity, etc. of accidents associated with each vehicle. Using the OEM-agnostic terminology for each feature associated with each vehicle and the vehicle accident information for each vehicle, an effectiveness score associated with each feature may be calculated.

20 Claims, 7 Drawing Sheets

Related U.S. Application Data filed on Sep. 25, 2019, provisional application No. 62/879,130, filed on Jul. 26, 2019, provisional application No. 62/874,749, filed on Jul. 16, 2019.

(51) Int. Cl.
*G06Q 40/08* (2012.01)
*G06N 20/00* (2019.01)

(52) U.S. Cl.
CPC ....... *G07C 5/02* (2013.01); *B60W 2050/0083* (2013.01); *B60W 2556/55* (2020.02)

(58) Field of Classification Search
USPC ........................................................ 701/29.3
See application file for complete search history.

(56) References Cited

U.S. PATENT DOCUMENTS

| 10,192,369 | B2 | 1/2019 | Wright |
| 10,198,879 | B2 | 2/2019 | Wright |
| 2007/0268158 | A1 | 11/2007 | Gunderson et al. |
| 2018/0275667 | A1 | 9/2018 | Liu et al. |
| 2019/0016342 | A1* | 1/2019 | Fredman ................ B60K 28/02 |
| 2019/0034197 | A1 | 1/2019 | Lin et al. |

* cited by examiner

Vehicle Building Information

[SF1H3AFC7JNXYZ008] [Search]

◎ View Original  ⤓ DOWNLOAD SPECS ▼

| VIN | SF1H3AFC7JNXYZ008 | Engine Type | Engine Type |
|---|---|---|---|
| MAKE | Audi | Body Type | Body Type |
| MODEL | A6 | Drive Type | Drive Type |
| YEAR | 2018 | Transmission | Transmission |
| Features | ▶ | | |

Proactive Passenger Protection System
Park Distance Warning
Electronic Stability Control
(Blind Spot Warning)
Advanced Driver Assistance Feature
Side Airbag
360-Degree Camera System
Dynamic Headlight Range Control
Lane Keeping Assist > The ontology model is applied to original build sheets through the classification process. Manufacturer-specific build sheet terms are identified and converted to common terminology as specified in the model.

FIG. 2A

Vehicle Build Information

AUTO | Search

Vehicle Feature
Automatic Braking System
Automatic Emergency Braking Sy
Automatic Headlight Control
Pedestrian Automatic Braking Type-ahead helps choose from common terminology Export list of VINs so they may be joined with other data for analytic purposes

Vehicle Build Information

BLIND SPOT WARNING | Search | Download (MAKE: Audi ⊗) (MAKE: Ford ⊗) (MAKE: Volkswagen ⊗) (MODEL: A6 ⊗) (MODEL: F-150 ⊗)
(MODEL: Mustang ⊗) (MODEL: Passat ⊗) (YEAR: 2019 ⊗) (YEAR: 2018 ⊗) (YEAR: 2017 ⊗)
(YEAR: 2016 ⊗) (YEAR: 2015 ⊗) (FEATURE : Blind Spot Warning ⊗)

Make
☑ Audi (0)
☑ Ford (0)
☑ Volkswagen (0)

Model
☑ A6 (0)
☑ F-150 (0)
☑ Mustang (0)
☑ Passat (0)

Year
☑ 2019 (0)
☑ 2018 (0)
☑ 2017 (0)
☑ 2016 (0)
☑ 2015 (0)

Vehicle Feature
☐ 360-Degree Camera System (0)
☐ Adaptive Cruise Control (0)
☐ Advanced Driver Assistance Feature (0)
☐ Advanced Safety Feature (0)

Show 10 ▼ entries                                    Search: [     ]

| Make ▲ | Model ▲ | Year ▲ | VIN ▲ | |
|---|---|---|---|---|
| Audi | A6 | 2018 | SF1H3AFCXJNXYZ014 | Details |
| Audi | A6 | 2018 | SF1H3AFC9JNXYZ007 | Details |
| Audi | A6 | 2018 | SF1HFAFC8JNXYZ015 | Details |
| Audi | A6 | 2018 | SF1H3BFC8JNXYZ012 | Details |
| Audi | A6 | 2018 | SF1H3AFC7JNXYZ008 | Details |
| Audi | A6 | 2018 | SF1H3AFCXJNXYZ012 | Details |
| Audi | A6 | 2018 | SF1H3AFC8JNXYZ003 | Details |
| Audi | A6 | 2018 | SF1H3AFC7JNXYZ009 | Details |

Faceting will help narrow search results (i.e., show all VINs from 2017 Ford F-150 models with Blind Spot Warning and Forward Collision Warning)

FIG. 2B

SYSTEMS AND METHODS OF DETERMINING EFFECTIVENESS OF VEHICLE SAFETY FEATURES

CROSS-REFERENCE TO RELATED APPLICATIONS

The present application claims the priority benefit of U.S. Provisional Patent Application No. 62/874,749, filed Jul. 16, 2019, entitled "SYSTEMS AND METHODS OF DETERMINING EFFECTIVENESS OF VEHICLE SAFETY FEATURES"; U.S. Provisional Patent Application No. 62/879,130, filed Jul. 26, 2019, entitled "SYSTEMS AND METHODS OF DETERMINING EFFECTIVENESS OF VEHICLE SAFETY FEATURES"; U.S. Provisional Patent Application No. 62/905,742, filed Sep. 25, 2019, entitled "SYSTEMS AND METHODS OF DETERMINING EFFECTIVENESS OF VEHICLE SAFETY FEATURES"; and U.S. Provisional Patent Application No. 62/935,980, filed Nov. 15, 2019, entitled "SYSTEMS AND METHODS OF DETERMINING EFFECTIVENESS OF VEHICLE SAFETY FEATURES"; each of which are incorporated herein by reference in their entirety.

FIELD OF THE DISCLOSURE

The present disclosure generally relates to vehicle safety and, more particularly, to systems and methods of determining the effectiveness of vehicle safety features.

BACKGROUND

The background description provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

Currently, many vehicles are equipped with smart safety features configured to improve the safety of the vehicle. However, it can be difficult to determine which smart safety features are most effective at preventing (or decreasing the frequency or severity of) vehicle accidents.

SUMMARY

The present embodiments may include collecting initial vehicle build information for various automobiles, such as newly manufactured automobiles. The initial vehicle build information may include advanced driver assist features, autonomous or semi-autonomous vehicle features, technologies, or systems, and/or other safety and newly developed features, systems, and/or updated software versions for the systems. Vehicle data may then be collected as the vehicle is in use. For instance, operational data may be collected regarding new feature, system, and software performance and usage. The operational data may be analyzed and monitored to determine which new features, systems, and software versions are operating as intended, i.e., safely or with low risk, or with lower risk than conventional systems, and/or those technologies that need to be revised or improved upon to further lower the risk of automobile collisions and enhance vehicle safety.

In one aspect, vehicle build information (VBI) for vehicles manufactured by a plurality of OEMs may be obtained. The VBI may contain OEM-specific terminology for smart safety features associated with each vehicle. The obtained VBI may be analyzed to generate an ontology model mapping each feature to any OEM-specific terminology associated with the feature. The ontology model may be applied to the VBI to generate translated VBI for each vehicle, such that the OEM-specific terminology associated with each feature is replaced with OEM-agnostic terminology for the feature (i.e., common terminology for the feature). Vehicle accident record information may be obtained for each vehicle, including, e.g., the number, frequency, severity, etc. of accidents associated with each vehicle. Using the OEM-agnostic terminology for each feature associated with each vehicle and the vehicle accident information for each vehicle, an effectiveness score associated with each feature may be calculated.

In another aspect, a computer-implemented method for determining the effectiveness of vehicle safety features is provided. The method may include: (1) obtaining, by one or more processors (and/or associated transceivers), vehicle build information for a plurality of vehicles manufactured by a plurality of original equipment manufacturers (OEMs), the vehicle build information containing OEM-specific terminology associated with one or more smart safety features associated with each vehicle; (2) analyzing, by the one or more processors, obtained vehicle build information to generate an ontology model mapping each smart safety feature to any OEM-specific terminology associated with the smart safety feature for each OEM; (3) applying, by the one or more processors, the ontology model to the vehicle build information to generate translated vehicle build information for each of the plurality of vehicles, such that the OEM-specific terminology associated with each smart safety feature is replaced with OEM-agnostic terminology for the smart safety feature; (4) obtaining, by the one or more processors (and/or associated transceivers), vehicle accident record information for each of the plurality of vehicles, wherein the vehicle accident record information includes one or more of a number of accidents, a frequency of accidents, or a severity of accidents associated with each of the plurality of vehicles; and/or (5) calculating, by the one or more processors, using the OEM-agnostic terminology for each smart safety feature associated with each of the plurality of vehicles and the vehicle accident record information for each of the plurality of vehicles, an effectiveness score associated with each smart safety feature. The method may include additional, less, or alternate actions, including those discussed elsewhere herein.

In another aspect, a computer system for determining the effectiveness of vehicle safety features is provided. The computer system may include one or more processors and/or associated transceivers; and a non-transitory program memory communicatively coupled to the one or more processors and/or associated transceivers, and storing executable instructions. The executable instructions, when executed by the one or more processors, may cause the computer system to: (1) obtain vehicle build information for a plurality of vehicles manufactured by a plurality of original equipment manufacturers (OEMs), the vehicle build information containing OEM-specific terminology associated with one or more smart safety features associated with each vehicle; (2) analyze obtained vehicle build information to generate an ontology model mapping each smart safety feature to any OEM-specific terminology associated with the smart safety feature for each OEM; (3) apply the ontology model to the vehicle build information to generate translated vehicle build information for each of the plurality of vehicles, such that the OEM-specific terminology associated with each smart safety feature is replaced with OEM-agnostic terminology for the smart safety feature; (4) obtain vehicle accident record information for each of the plurality of vehicles, wherein the vehicle accident record information includes one or more of a number of accidents, a frequency of accidents, or a severity of accidents associated with each of the plurality of vehicles; and/or (5) calculate, using the OEM-agnostic terminology for each smart safety feature associated with each of the plurality of vehicles and the vehicle accident record information for each of the plurality of vehicles, an effectiveness score associated with each smart safety feature. The computer system may include additional, less, or alternate functionality, including that discussed elsewhere herein.

In another aspect, a tangible, non-transitory computer-readable medium storing executable instructions for determining the effectiveness of vehicle safety features is provided. The executable instructions, when executed by at least one processor of a computer system, may cause the computer system to: (1) obtain vehicle build information for a plurality of vehicles manufactured by a plurality of original equipment manufacturers (OEMs), the vehicle build information containing OEM-specific terminology associated with one or more smart safety features associated with each vehicle; (2) analyze obtained vehicle build information to generate an ontology model mapping each smart safety feature to any OEM-specific terminology associated with the smart safety feature for each OEM; (3) apply the ontology model to the vehicle build information to generate translated vehicle build information for each of the plurality of vehicles, such that the OEM-specific terminology associated with each smart safety feature is replaced with OEM-agnostic terminology for the smart safety feature; (4) obtain vehicle accident record information for each of the plurality of vehicles, wherein the vehicle accident record information includes one or more of a number of accidents, a frequency of accidents, or a severity of accidents associated with each of the plurality of vehicles; and/or (5) calculate, using the OEM-agnostic terminology for each smart safety feature associated with each of the plurality of vehicles and the vehicle accident record information for each of the plurality of vehicles, an effectiveness score associated with each smart safety feature. The executable instructions may direct additional, less, or alternate functionality, including that discussed elsewhere herein.

In another aspect, a computer-implemented method for determining the effectiveness of vehicle safety features is provided. The method may include: (1) obtaining, collecting, or receiving, by one or more processors and/or associated transceivers (such as via wireless communication or data transmission over one or more radio frequency links), vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generating or using, via the one or more processors, an ontology or ontology model to develop a common terminology for the AVSFs or one or more smart safety features; (3) collecting or receiving, via the one or more processors and/or associated transceivers (such as via wireless communication or data transmission over one or more radio frequency links), vehicle telematics data and/or AVSF data from a mobile device associated with a vehicle owner or a vehicle controller or transceiver; and/or (4) analyzing, via the one or more processors, the vehicle telematics data and/or AVSF data to determine an individual AVSF performance rating or safety score for each AVSF defined by the ontology or ontology model. The method may include additional, less, or alternate actions, including those discussed elsewhere herein.

In another aspect, a computer system configured to determine the effectiveness of vehicle safety features is provided. The computer system may include one or more processors, servers, and/or associated transceivers configured to: (1) obtain, collect, or receive, such as via wireless communication or data transmission over one or more radio frequency links, vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generate or use an ontology or ontology model to develop a common terminology for the AVSFs or one or more smart safety features; (3) collect or receive, such as via wireless communication or data transmission over one or more radio frequency links, vehicle telematics data and/or AVSF data from a mobile device associated with a vehicle owner or a vehicle controller or transceiver; and/or (4) analyze the vehicle telematics data and/or AVSF data to determine an individual AVSF performance rating or safety score for each AVSF defined by the ontology or ontology score. The computer system may include additional, less, or alternate functionality, including that discussed elsewhere herein.

In another aspect, a computer-implemented method for determining the effectiveness of vehicle safety features is provided. The method may include: (1) obtaining, collecting, or receiving, by one or more processors and/or associated transceivers (such as via wireless communication or data transmission over one or more radio frequency links), vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generating or using, via the one or more processors, an ontology or ontology model to develop a common terminology for the AVSFs or one or more smart safety features; (3) collecting or receiving, via the one or more processors and/or associated transceivers (such as via wireless communication or data transmission over one or more radio frequency links), vehicle telematics data associated with a vehicle collision and/or AVSF data associated with the vehicle collision, such as from a mobile device associated with a vehicle owner or a vehicle controller or transceiver; and/or (4) analyzing, via the one or more processors, the vehicle telematics data associated with the vehicle collision and/or AVSF data associated with the vehicle collision to determine an individual AVSF performance rating or safety score for each AVSF defined by the ontology or ontology model. The method may include additional, less, or alternate actions, including those discussed elsewhere herein.

In another aspect, a computer system configured to determine the effectiveness of vehicle safety features is provided. The computer system may include one or more processors, servers, and/or associated transceivers configured to: (1) obtain, collect, or receive, such as via wireless communication or data transmission over one or more radio frequency links, vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generate or use an ontology or ontology model to develop a common terminology for the AVSFs or one or more smart safety features; (3) collect or receive, such as via wireless communication or data transmission over one or more radio frequency links, vehicle telematics data associated with the vehicle collision and/or AVSF data associated with the vehicle collision, such as from a mobile device associated with a vehicle owner or a vehicle controller or transceiver; and/or (4) analyze the vehicle telematics data associated with the vehicle collision and/or AVSF data associated with the vehicle collision to determine an individual AVSF performance rating or safety score. The computer system may include additional, less, or alternate functionality, including that discussed elsewhere herein.

In another aspect, a computer-implemented method for analyzing the performance of vehicle safety features is provided. The method may include: (1) obtaining, collecting, or receiving, by one or more processors and/or associated transceivers (such as via wireless communication or data transmission over one or more radio frequency links), vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generating or using, via the one or more processors, an ontology or ontology model to develop a common terminology for the AVSFs or one or more smart safety features; (3) collecting or receiving, via the one or more processors and/or associated transceivers (such as via wireless communication or data transmission over one or more radio frequency links), vehicle telematics data associated with a vehicle collision and/or AVSF data associated with the vehicle collision, such as from a mobile device associated with a vehicle owner or a vehicle controller or transceiver; and/or (4) analyzing, via the one or more processors, the vehicle telematics data associated with the vehicle collision and/or AVSF data associated with the vehicle collision to determine, for each AVSF defined by the ontology or ontology model, (i) whether the performance of the AVSF was relevant to the vehicle collision and/or (ii) whether the AVSF operated as intended prior to, during, and/or after the vehicle collision. The method may include additional, less, or alternate actions, including those discussed elsewhere herein.

In another aspect, a computer system configured to analyze the performance of vehicle safety features is provided. The computer system may include one or more processors, servers, and/or associated transceivers configured to: (1) obtain, collect, or receive, such as via wireless communication or data transmission over one or more radio frequency links, vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generate or use an ontology or ontology model to develop a common terminology for the AVSFs or one or more smart safety features; (3) collect or receive, such as via wireless communication or data transmission over one or more radio frequency links, vehicle telematics data associated with a vehicle collision and/or AVSF data associated with the vehicle collision, such as from a mobile device associated with a vehicle owner or a vehicle controller or transceiver; and/or (4) analyze the vehicle telematics data associated with the vehicle collision and/or AVSF data associated with the vehicle collision to determine, for each AVSF defined by the ontology or ontology model, (i) whether the performance of the AVSF was relevant to the vehicle collision and/or (ii) whether the AVSF operated as intended prior to, during, and/or after the vehicle collision. The computer system may include additional, less, or alternate functionality, including that discussed elsewhere herein.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

FIG. 2A illustrates an example of applying an ontology model to OEM-specific vehicle build information to generate translated vehicle build information, such that OEM-specific terminology associated with smart safety features is replaced with OEM-agnostic terminology for the smart safety features, in accordance with some embodiments;

FIG. 2B illustrates an exemplary display of a user interface for searching for vehicles that have a particular type of smart safety feature, in accordance with some embodiments;

Figure 1:
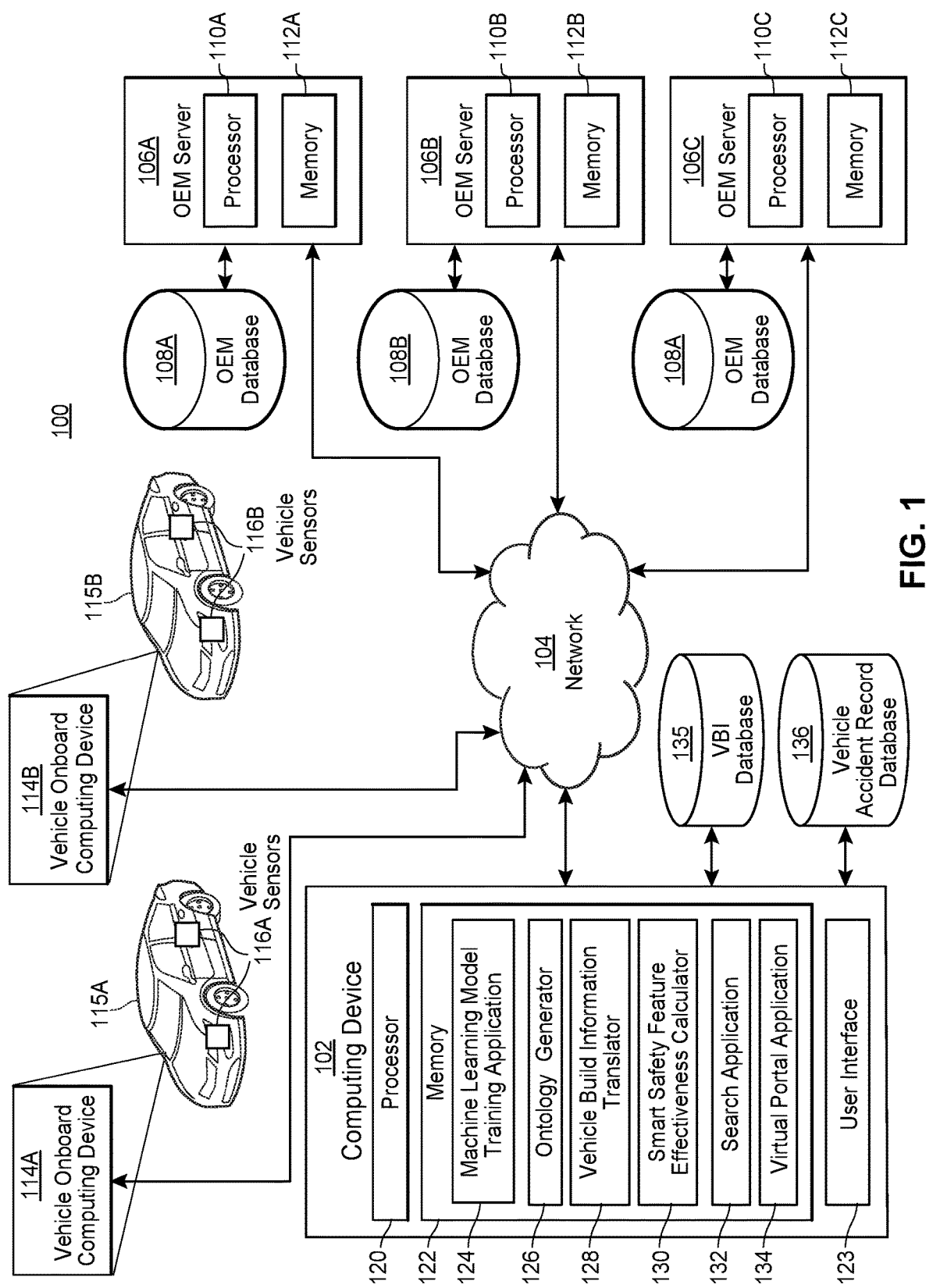
FIG. 1 illustrates a block diagram of an exemplary computer system for determining the effectiveness of vehicle safety features, in accordance with some embodiments.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Currently, many vehicles are equipped with smart safety features configured to improve the safety of the vehicle (also called "advanced vehicle safety features" (AVSFs)). These smart safety features may include, e.g., smart parking assistance, adaptive cruise control, adaptive headlights, blind spot monitoring, forward collision warning, automatic emergency braking, automatic emergency steering, lane-departure warning, lane centering, rear cross-traffic alerts, smart vehicle cameras, driver assist technologies, semi-autonomous and/or autonomous technologies and systems, etc. However, it can be difficult to determine which smart safety features are most effective at preventing (or decreasing the frequency or severity of) vehicle accidents.

While vehicle accident records may provide information indicating vehicle accident data sorted by vehicle identification number (VIN), VINs currently may not provide an indication of whether a vehicle is equipped with a particular smart safety feature. That is, while a VIN includes information such as the year, the make, and the model of the vehicle, there can be great variability in smart safety features even between vehicles of the same year, make, and model due to the highly customizable nature of smart safety features. Furthermore, in many instances, smart safety features may be switched on or off by a vehicle operator. However, vehicle accident records currently do not include information indicating whether or not a particular smart safety feature was switched on or off at the time of an accident.

Moreover, even if the smart safety features of a given vehicle are known, it can be difficult to compare the effectiveness of smart safety features between vehicle manufacturers because different vehicle manufacturer often use different terminology for the same safety technology. For example, while many original equipment manufacturers (OEMs) manufacture vehicles enabled with blind spot detection, one OEM may call this feature "lane change assist," while another OEM calls this feature "blind spot monitor." Furthermore, in some examples, one OEM may use different terminology for the same feature in marketing (e.g., "pre-sense") compared to in technical documents (e.g., "blind spot information system").

Systems and methods of determining the effectiveness of vehicle safety features are provided herein. In particular, vehicle build information obtained directly from a plurality of OEMs may be analyzed to generate an ontology mapping similar or same smart safety features between OEMs. For instance, machine learning or natural language processing may be used to group similar terminology from different OEMs, e.g., based upon similarities between descriptions of each term and/or based upon similarities between the terms themselves. Using the generated ontology, build information from a variety of vehicles from different OEMs may be translated into a common language. For example, the terms "lane change assist," "blind spot monitor," "pre-sense," and "blind spot info system," as indicated in build information from vehicles from different OEMs, may each be translated to an umbrella term "blind spot detection."

Accordingly, the translated build information for each vehicle may be cross-referenced to vehicle accident records associated with the vehicle's VIN. Using the translated build information and the vehicle accident record for each vehicle, a number, frequency, severity, etc. of accidents associated with each smart safety feature may be calculated to determine an effectiveness score for each smart safety feature. In some examples, telematics data captured by sensors associated with the vehicle may be analyzed to determine whether or not the smart safety feature was switched on at the time of the accident, and this determination may factor into the effectiveness score for the smart safety feature. Moreover, in some examples, a data log from a computing device associated with the vehicle may be analyzed to determine whether the smart safety feature had been updated at the time of the accident, or what version of software associated with the smart safety feature was used at the time of the accident, and this determination may factor into the effectiveness score for the smart safety feature as well.

In particular, the effectiveness scores for various smart safety features may be compared, ranked, etc. Practically speaking, the effectiveness scores for the smart safety features of a given vehicle may be provided to consumers, who may use these effectiveness scores for smart safety features associated with various vehicles to determine which vehicles are safest (e.g., when renting a vehicle, when purchasing a vehicle, when being transported by a vehicle when using a taxi or ride share service, etc.). Moreover, the effectiveness scores for the smart safety features of a given vehicle may be provided to OEMs, who may use this information to improve smart safety features and/or to develop more effective smart safety features.

Furthermore, in some examples, the effectiveness scores for each of the smart safety features of a given vehicle may be used to determine an insurance rating score for the vehicle and/or an insurance rating score for an insured party associated with the vehicle. Determining insurance ratings based upon the effectiveness scores for the smart safety features of a vehicle in this way improves upon conventional methods of determining insurance rating scores for vehicles, because conventionally, insurance rating scores for vehicles are simply based upon the make, model, and year of the vehicle, as indicated by the vehicle's VIN. However, with the introduction of smart safety features, there is now great variability in safety features even between vehicles of the same make, model, and year.

Consequently, conventional methods for determining insurance ratings for vehicles cannot account for specific information about which smart safety features are enabled for a particular vehicle. In contrast, the present disclosure provides ways of improving upon these conventional methods for determining insurance ratings by individualizing these ratings for specific vehicles by incorporating effectiveness scores for various smart safety features enabled for the vehicle into these insurance ratings.

Exemplary System for Determining Safety Effectiveness

Referring now to the drawings, FIG. 1 illustrates a block diagram of an exemplary computer system 100 for determining the effectiveness of vehicle safety features, in accordance with some embodiments. The high-level architecture illustrated in FIG. 1 may include both hardware and software applications, as well as various data communications channels for communicating data between the various hardware and software components, as is described below. The system may include a computing device 102 configured to communicate, e.g., via a network 104 (which may be a wired or wireless network), with OEM servers 106A, 106B, 106C associated with various OEMs. Although three OEM servers 106A, 106B, 106C associated with three separate OEMs are shown in FIG. 1, a greater or fewer number of OEM servers may be included in various embodiments. The OEM servers 106A, 106B, 106C may each respectively be associated with OEM databases 108A, 108B, 108C storing, inter alia, vehicle build information (e.g., in the form of vehicle build sheets) associated with vehicles manufactured by the OEM.

Furthermore the OEM servers 106A, 106B, 106C may each respectively include one or more processors 110A, 110B, 110C, such as one or more microprocessors, controllers, and/or any other suitable type of processor. The OEM servers 106A, 106B, 106C may each respectively further include a memory 112A, 112B, 112C (e.g., volatile memory, non-volatile memory) accessible by the respective one or more processors 110A, 110B, 110C, (e.g., via a memory controller). The respective one or more processors 110A, 110B, 110C may each interact with the respective memories 112A, 112B, 112C to obtain, for example, computer-readable instructions stored in the respective memories 112A, 112B, 112C. Additionally or alternatively, computer-readable instructions may be stored on one or more removable media (e.g., a compact disc, a digital versatile disc, removable flash memory, etc.) that may be coupled to the OEM servers 106A, 106B, 106C to provide access to the computer-readable instructions stored thereon. In particular, the computer-readable instructions stored on the respective memories 112A, 112B, 112C may include instructions for transmitting vehicle build information from the respective OEM databases 108A, 108B, 108C to the computing device 102 (e.g., via the network 104).

The computing device 102 may further communicate with vehicle onboard computing devices 114A, 114B associated with respective vehicles 115A, 115B. For example, the vehicle onboard computing devices may interface with vehicle sensors 116A, 116B associated with respective vehicles 115A, 115B. The vehicle sensors 116A, 116B may include, e.g., accelerometers, gyroscopes, cameras or other image sensors, light sensors, microphones or other sound sensors, or any other suitable sensors. In particular, the vehicle sensors 116A, 116B may be configured to capture telematics data associated with respective vehicles 115A, 115B. Telematics data may include, e.g., one or more of speed data, acceleration data, braking data, cornering data, object range distance data (e.g., following distance data), turn signal data, seatbelt use data, location data, phone use data, date/time data, weather data, road type data, or any other suitable vehicle telematics data. Although two vehicles 115A, 115B and two associated vehicle onboard computing devices 114A, 114B and sets of vehicle sensors 116A, 116B are shown in FIG. 1, any number of vehicles, vehicle onboard computing devices, and/or vehicle sensors may be included in various embodiments.

The vehicle onboard computing devices 114A, 114B may each respectively include one or more processors (not shown) such as one or more microprocessors, controllers, and/or any other suitable type of processor. The vehicle onboard computing devices 114A, 114B may each respectively further include a memory (not shown), e.g., volatile memory, non-volatile memory, etc., accessible by the respective one or more processors (e.g., via a memory controller). The respective one or more processors associated with each vehicle onboard computing device 114A, 114B may each interact with the respective memories to obtain, for example, computer-readable instructions stored in the respective memories. Additionally or alternatively, computer-readable instructions may be stored on one or more removable media (e.g., a compact disc, a digital versatile disc, removable flash memory, etc.) that may be coupled to each vehicle onboard computing device 114A, 114B to provide access to the computer-readable instructions stored thereon.

In particular, the computer-readable instructions stored on the respective memories of each vehicle onboard computing device 114A, 114B may include instructions for controlling the vehicle (e.g., controlling the braking, steering, headlights, cameras, or other components of the vehicle) in order to enable smart safety features such as, e.g., smart parking assistance, adaptive cruise control, adaptive headlights, blind spot monitoring, forward collision warning, automatic emergency braking, automatic emergency steering, lane-departure warning, lane centering, rear cross-traffic alerts, smart vehicle cameras, etc. For instance, the instructions may include instructions for controlling the respective vehicle 115A, 115B to enable smart safety features based upon inputs from the respective sensors 116A, 116B.

Furthermore, these instructions may include instructions for transmitting telematics data associated with respective vehicles 115A, 115B to the computing device 102 (e.g., via the network 104). Moreover, these instructions may include instructions for transmitting (e.g., via the network 104) indications of which smart safety features associated with the respective vehicle 115A, 115B were enabled or activated at various dates or times, either automatically or based upon a request from the computing device 102.

Furthermore the computing device 102 may include one or more processors 120 such as one or more microprocessors, controllers, and/or any other suitable type of processor. The computing device 102 may further include a memory 122 (e.g., volatile memory, non-volatile memory) accessible by the one or more processors 120, (e.g., via a memory controller). Additionally, the computing device may include a user interface 123.

The one or more processors 120 may interact with the memory 122 to obtain, for example, computer-readable instructions stored in the memory 122. Additionally or alternatively, computer-readable instructions may be stored on one or more removable media (e.g., a compact disc, a digital versatile disc, removable flash memory, etc.) that may be coupled to the computing device 102 to provide access to the computer-readable instructions stored thereon. In particular, the computer-readable instructions stored on the memory 122 may include instructions for executing various applications, such as, e.g., a machine learning model training application 124, an ontology generator 126, a vehicle build information translator 128, a smart safety feature effectiveness calculator 130, a search application 132, and/or a virtual portal application 134.

For example, the machine learning model training application 124 may train a machine learning model to group similar terminology from different OEMs, e.g., based upon similarities between descriptions of each term and/or based upon similarities between the terms themselves, using several known OEM-specific terms from each of a plurality of OEMs.

In general, training the machine learning model (and/or neural network model) may include establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values.

In one embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction.

The ontology generator 126 may apply the trained machine learning model to the vehicle build information from the OEM databases 108A, 108B, 108C in order to generate an ontology model mapping similar or same smart safety features between OEMs to OEM-specific terminology describing each feature for the OEMs associated with OEM servers 106A, 106B, 106C.

The vehicle build information translator 128 may apply the ontology model to the vehicle build information from the OEM databases 108A, 108B, 108C to translate the vehicle build information each of the different OEMs into a common language (i.e., by translating OEM-specific terminology to OEM-agnostic terminology). For example, the vehicle build information stored in the OEM database 108A may use the OEM-specific term "lane change assist," to describe a blind spot detection smart safety feature, while the vehicle build information stored in the OEM database 108B may use the OEM-specific term "blind spot monitor" to describe a blind spot detection feature that is substantially the same, the OEM database 108C may use the OEM-specific term "blind spot info system" to describe the same blind spot detection feature, etc. The vehicle build information translator 128 may translate each of these terms to an OEM-agnostic term for the smart safety feature, e.g., "blind spot detection smart safety feature." In particular, the vehicle build information translator 128 may store the translated vehicle build information in a vehicle build information (VBI) database 135.

The smart safety feature effectiveness calculator 130 may use the translated vehicle build information from the VBI database 135, along with information obtained from a vehicle accident record database 136 storing indications of accident history associated with various vehicles, and/or vehicle telematics data from vehicle onboard computing devices 114A, 114B (e.g., indicative of vehicle collisions, indicative of which smart safety features were operating during vehicle collisions, etc.), to calculate effectiveness scores for each smart safety feature. For instance, an accident rate may be calculated for all vehicles associated with a particular OEM-agnostic term for a smart safety feature, and the effectiveness of the smart safety feature may be calculated based at least in part on this accident rate.

Moreover, in some examples, the smart safety feature effectiveness calculator 130 may calculate a score indicative of the relevance of a given smart safety feature's performance in particular accidents. For instance, this score may indicate whether the smart safety feature's performance was likely relevant to a particular accident or collision, and/or whether the smart safety feature was likely operating as intended during a particular accident or collision. Moreover, in some examples, the smart safety feature effectiveness calculator 130 may calculate a percentage of fault associated with each smart safety feature for a particular accident or collision.

The search application 132 may provide a search feature to be displayed to a user via, e.g., via a web interface or via the user interface 123. In one example, the search application 132 may receive user input indicating a vehicle identification number (VIN) to be searched, and may search the vehicle build information to locate a matching vehicle and its associated smart safety features. Accordingly, the search application 132 may cause the user interface 123 to display, based upon the user input, a listing of smart safety features associated with the VIN, e.g., as shown in FIG. 2A. As another example, the search application 132 may receive user input indicating a smart safety feature to be searched, and may cause the user interface 123 to display, based upon the user input, a listing of vehicles having the smart safety feature and/or a listing of vehicle identification numbers (VINs) associated with those vehicles, e.g., as shown in FIG. 2B. In some examples, the user may use any terminology (e.g., OEM-specific terminology or OEM-agnostic terminology) for the feature, and the ontology model may be used to translate the user's input into OEM-agnostic terminology for the feature. Accordingly, the search application 132 may search the vehicle build information using the OEM-agnostic terminology and locate results to be displayed to the user.

Figure 3:
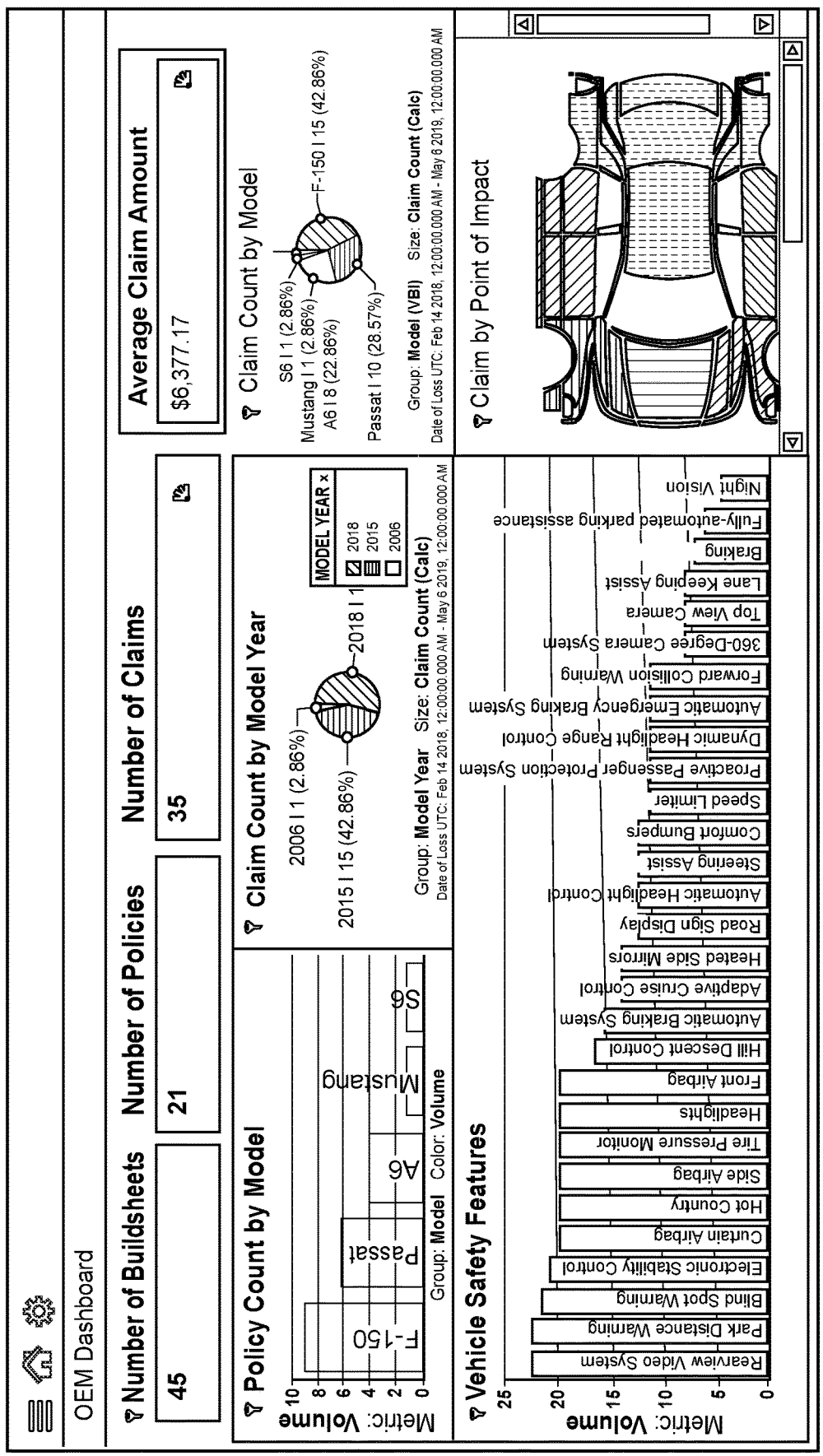
FIG. 3 illustrates an exemplary display of a user interface for a virtual portal for providing information about the performance of smart safety features to OEMs, in accordance with some embodiments.

The virtual portal application 134 may generate a virtual portal that provides information about the performance of various smart safety features and display the virtual portal to a user, e.g., via a web interface or via the user interface 123, e.g., as shown in FIG. 3. The virtual portal application 134 may cause the user interface 123 to display, for instance, smart feature effectiveness information and/or scores, as calculated by the smart safety feature effectiveness calculator 130.

Additionally, the virtual portal application 134 may cause the user interface 123 to display information related to various vehicle models manufactured by a particular OEM to a user associated with the OEM (e.g., a representative of the OEM). For instance, virtual portal application 134 may cause the user interface 123 to display an indication of a number of smart safety features associated with each vehicle model, a number of insurance policies associated with each vehicle model and/or associated with each smart safety feature, a number of insurance claims associated with each vehicle model and/or associated with each smart safety feature, a number of insurance claims associated with each vehicle model by year, etc. Moreover, the virtual portal application 134 may cause the user interface 123 to display an indication of a number of claims at each point of impact for a particular vehicle model and/or for a particular AVSF. This information may be displayed visually (e.g., by shading a portion of a diagram of a vehicle in different colors based upon the number of claims associated with that portion of the vehicle), or as a graph (e.g., in the form of a pie chart, bar graph, histogram, etc. illustrating a number of claims associated with various vehicle portions).

Moreover, the computer-readable instructions stored on the memory 122 may include instructions for carrying out any of the steps of the methods 400, 500, and 600 described in greater detail below with respect to FIGS. 4, 5, and 6, respectively. Furthermore, the computer-readable instructions stored on the memory 122 may include instructions for executing additional or alternative applications in various embodiments.

FIG. 2A illustrates an example of applying an ontology model to OEM-specific vehicle build information to generate translated vehicle build information, such that OEM-specific terminology associated with smart safety features is replaced with OEM-agnostic terminology for the smart safety features, in accordance with some embodiments. For instance, "lane change assist and lane keeping system," from the vehicle build sheet of a vehicle manufactured by a particular OEM, may be translated to the OEM-agnostic term "blind spot warning." In particular, FIG. 2A illustrates an example display of a user interface (e.g., user interface 123) showing the results of a search for a vehicle having a particular vehicle identification number (VIN). Accordingly, using this user interface, a user who looks up a particular VIN may see results indicating the OEM-agnostic terminology for smart safety features that are associated with the vehicle having the particular VIN.

FIG. 2B illustrates an exemplary display of a user interface (e.g., user interface 123) for searching for vehicles that have a particular type of smart safety feature, in accordance with some embodiments. When a user searches for a particular feature using the user interface shown in FIG. 2B, using OEM-agnostic terminology or any OEM-specific terminology for the feature, the user interface may display a listing of all vehicles (and/or the VINs associated therewith) associated with that feature. In other words, the user may use any terminology for the feature, and the ontology model may be used to translate the user's search into OEM-agnostic terminology for the feature. Accordingly, the translated vehicle build information may be searched to locate vehicles associated with the feature, and the VINs for vehicles associated with the feature may be displayed to the user.

For instance, in the context of an insurance provider, the search features shown at FIGS. 2A and 2B may be utilized, e.g., in order to analyze loss data for setting rates for vehicles with certain features, to apply rating groups based upon vehicle features, to verify the presence of vehicle features for claim processing and/or fraud-detection purposes, and to analyze the effectiveness and/or performance of various vehicle features.

FIG. 3 illustrates an exemplary display of a user interface (e.g., user interface 123) for a virtual portal for providing information about the performance of smart safety features to OEMs, in accordance with some embodiments. For example, using the user interface shown, information related to various vehicle models manufactured by the OEM may be displayed for an OEM user (e.g., a representative of the OEM). For instance, the user interface may display an indication of a number of smart safety features associated with each vehicle model, a number of insurance policies associated with each vehicle model and/or associated with each smart safety feature, a number of insurance claims associated with each vehicle model and/or associated with each smart safety feature, a number of insurance claims associated with each vehicle model by year, etc.

The user interface shown in FIG. 3 may further display an indication of a number of claims at each point of impact for a particular vehicle model and/or for a particular smart safety feature. This information may be displayed visually (e.g., by shading a portion of a diagram of a vehicle in different colors based upon the number of claims associated with that portion of the vehicle), or as a graph (e.g., in the form of a pie chart, bar graph, histogram, etc. illustrating a number of claims associated with various vehicle portions).

For instance, in the context of an OEM, the virtual portal shown at FIG. 3 may be utilized, e.g., in order to inform future vehicle design decisions of vehicle feature sets, to understand the effectiveness of vehicle features and/or repair costs, and/or to factor insurance costs into the "total cost of ownership" for their vehicles.

Exemplary Safety Effectiveness Determination

Figure 4:
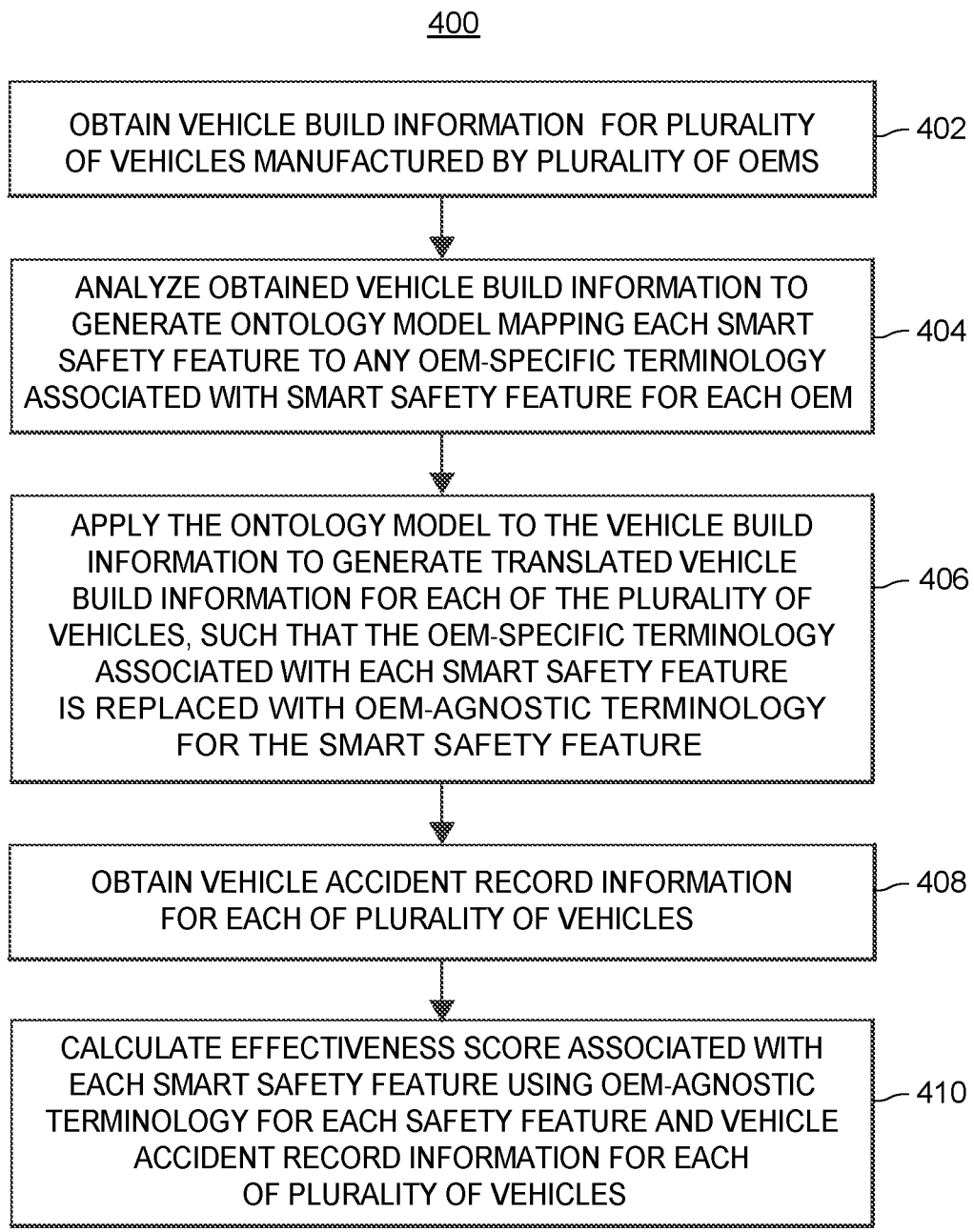
FIG. 4 illustrates a flow diagram of an exemplary computer-implemented method for determining the effectiveness of vehicle safety features, in accordance with some embodiments.

FIG. 4 illustrates a flow diagram of an exemplary method 400 for determining the effectiveness of vehicle safety features, in accordance with some embodiments. One or more steps of the method 400 may be implemented as a set of instructions stored on a computer-readable memory and executable on one or more processors. While "smart safety features" are discussed herein, the method 400 may be applied to determine the effectiveness of any kind of vehicle safety features.

Vehicle build information for a plurality of vehicles manufactured by a plurality of OEMs may be obtained (block 402), e.g., from databases associated with each OEM. For example, the vehicle build information obtained from each OEM may include information from vehicle build sheets for each individual vehicle manufactured by that OEM, with each vehicle build sheet listing all features of the individual vehicle.

The vehicle build information may contain, for instance OEM-specific terminology associated with one or more smart safety features associated with each vehicle. For instance, a first OEM may use the terminology "lane change assist" for a blind spot detection smart safety feature, while a second OEM may use the terminology "blind spot info system," and a third OEM may use the terminology "blind spot monitor," for essentially the same blind spot detection smart safety feature. As another examiner, a first OEM may use the terminology "adaptive cruise assist" for an adaptive cruise control feature, while a second OEM may use the terminology "predictive cruise control," and a third OEM may use the terminology "active cruise control," for essentially the same adaptive cruise control feature. Consequently, in some examples, vehicle build sheets for vehicles manufactured by different OEMs may each have different OEM-specific terminology for the essentially the same smart safety features.

The obtained vehicle build information may be analyzed (block 404) by a processor to generate an ontology model mapping each smart safety feature to any OEM-specific terminology associated with the smart safety feature for each OEM. For instance, the ontology model may map the OEM-specific terms: "lane change assist," "blind spot info system," and "blind spot monitor" to the smart safety feature of blind spot detection. As another example, the ontology model may map "adaptive cruise assist," "predictive cruise control," and "active cruise control," to the smart safety feature of adaptive cruise control.

In some examples, a machine learning model may be trained using OEM-specific terminology associated with each of a plurality of known smart safety features for a plurality of OEMs. For instance, machine learning or natural language processing may be used to group similar terminology from different OEMs, e.g., based upon similarities between descriptions of each term and/or based upon similarities between the terms themselves. The trained machine learning model may be applied to the obtained vehicle build information in order to identify OEM-specific terminology associated with each smart safety feature for each OEM.

The ontology model may be applied (block 406) to the vehicle build information (e.g., as shown in FIG. 2A) to generate translated vehicle build information for each of the plurality of vehicles, such that the OEM-specific terminology associated with each smart safety feature is replaced with OEM-agnostic terminology for the smart safety feature. For instance, wherever OEM-specific terms such as "the OEM-specific terms: "lane change assist," "blind spot info system," and "blind spot monitor" appear in the vehicle build information for each of the plurality of vehicles, these terms may be replaced with an OEM-agnostic term (e.g., "blind spot detection feature"). Similarly, wherever OEM-specific terms such as "adaptive cruise assist," "predictive cruise control," and "active cruise control," appear in the vehicle build information for each of the plurality of vehicles, these terms may be replaced with an OEM-agnostic term (e.g., "adaptive cruise control feature"). Accordingly, the terminology used in the vehicle build information associated with each vehicle may be standardized such that the vehicle build information for each of the plurality of vehicles uses the same OEM-agnostic terminology when referring to features that are the same or essentially the same.

Vehicle accident record information may be obtained (block 408) for each of the plurality of vehicles. The vehicle accident record information may include, e.g., a number of accidents, a frequency of accidents, or a severity of accidents associated with each of the plurality of vehicles. Moreover, the vehicle accident record information may include dates and/or times associated with accidents associated with each of the plurality of vehicles.

An effectiveness score may be calculated (block 410) for each smart safety feature using the OEM-agnostic terminology for each smart safety feature associated with each vehicle and the vehicle accident record information for each vehicle. That is, by using OEM-agnostic terminology, effectiveness scores may be calculated for particular types of safety features present in vehicles manufactured by a variety of different OEMs. For instance, the effectiveness of blind spot detection features in general may be calculated for a plurality of vehicles associated with various OEMs. In some examples, these effectiveness scores may be generated or scored as percentages (e.g., 88% effective, 50% effective), or on a numerical scale (e.g., on a scale of 1-10).

Generally speaking, a higher effectiveness score may be calculated for smart safety features that are associated with vehicles that have fewer, less frequent, and/or less severe accidents or collisions. In some examples, calculating the effectiveness score may include obtaining vehicle telematics data and/or other data indicating whether smart safety features were activated and/or enabled at various dates or times for each of the plurality of vehicles. For instance, the vehicle telematics data and the vehicle accident record information for each vehicle may be used to determine whether a smart safety feature was activated or deactivated at a date and/or time associated with a vehicle accident.

Additionally, if a smart safety feature of a vehicle was deactivated at a date and/or time of an accident associated with the vehicle, then the data from that accident may not be included in the calculation of the effectiveness score for that smart safety feature, but if the smart safety feature was activated at the date and/or time of the accident, then the data from that accident may be included in the calculation of the effectiveness score for that smart safety feature. In some examples, the telematics data may be used to determine whether a smart feature was updated prior to a date and/or time associated with a vehicle accident, and/or when the smart feature was last updated prior to the accident, and this determination may be factored into the calculation of the effectiveness score for the smart safety feature.

Additionally, in some examples, calculating the effectiveness score may be based on an operational design domain of the safety feature, the road upon which the vehicle was operating and/or the environment in which the vehicle was operating at the date and/or time of the accident. Generally speaking, an operational design domain for a safety feature may include operating conditions under which the safety feature is specifically designed to function, including, but not limited to, environmental, geographical, and time-of-day restrictions, and/or the requisite presence or absence of certain traffic or roadway characteristics. For instance, an effectiveness score may be calculated for a specific safety feature in a specific driving environment. For instance, in some examples, the effectiveness score for a given safety feature may be calculated differently for vehicles operating on a divided highway than for vehicles operating on a city street. As another example, an effectiveness score may be calculated for a specific safety feature at night compared to during the day, on roads with a steep incline compared to flat roads, or for various other operational design domains.

Furthermore, in some examples, an effectiveness score may be calculated for a combination of smart safety features. For instance, in some examples, two or more smart safety features may be particularly effective when used in combination. Accordingly, individual effectiveness scores may be calculated for individual smart safety features, while combined effectiveness scores may be calculated for certain combinations of smart safety features. For example, a combined effectiveness score may be calculated for vehicles having both a blind spot detection feature and an adaptive cruise control feature.

Moreover, in some examples, the method 400 may include determining an insurance rating for a particular vehicle based upon the effectiveness scores associated with each smart safety feature associated with the vehicle, and/or based upon a particular combination of smart safety features associated with the vehicle. For example, insurance customers who own vehicles that have smart safety features with high effectiveness scores may be eligible for lower rates, or for certain discounts.

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to insured assets before (and/or after) an insurance-related event, including those events discussed elsewhere herein. In return, risk averse insureds may receive discounts or insurance cost savings related to home, renters, personal articles, auto, life, health, and other types of insurance from the insurance provider.

In one aspect, data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Exemplary Computer-Implemented Methods

Figure 5:
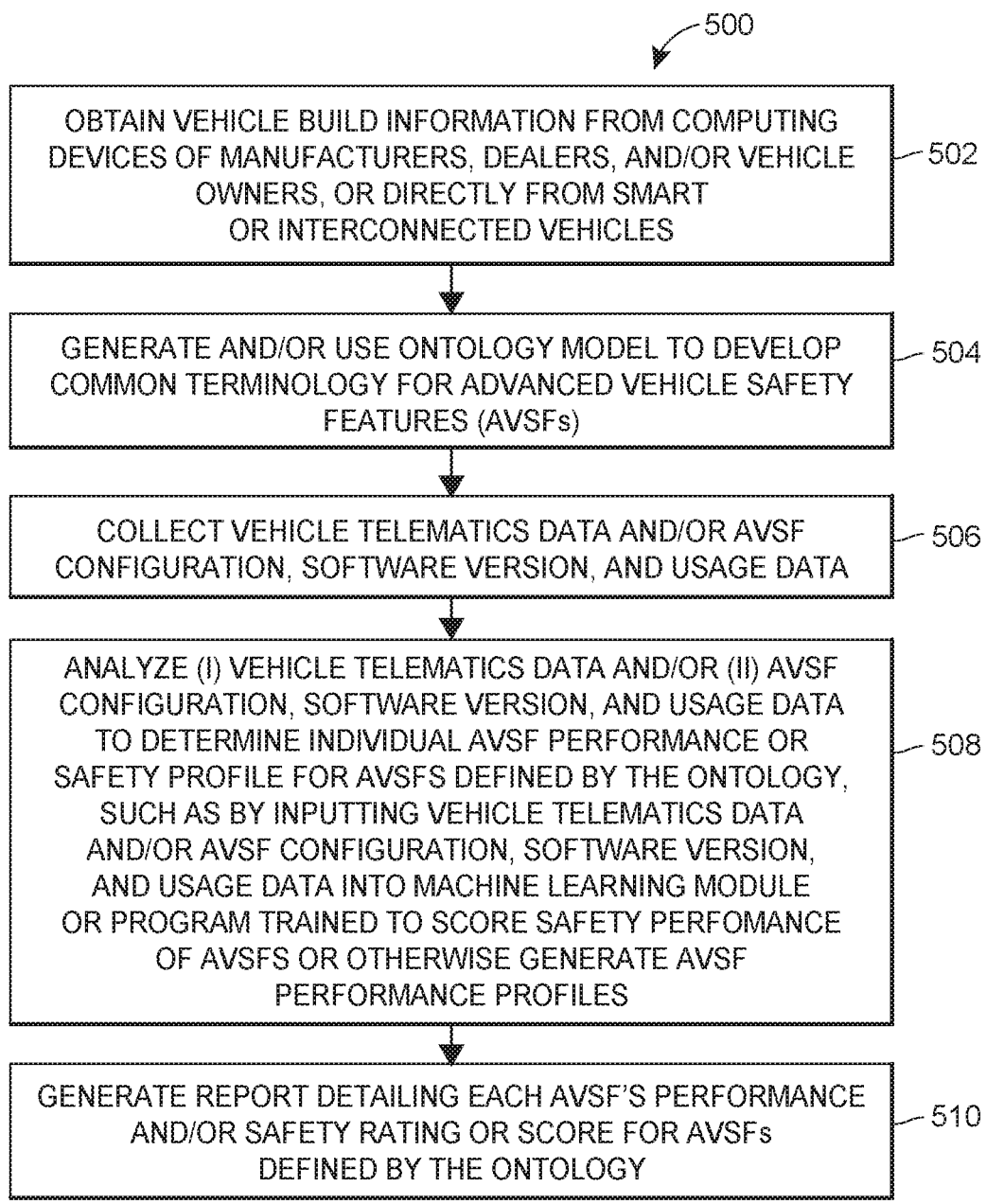
FIG. 5 illustrates an exemplary computer-implemented method of analyzing performance of advanced vehicle safety features.

FIG. 5 illustrates an exemplary computer-implemented method of analyzing performance of advanced vehicle safety features 500. The method 500 may include, via one or more processors and/or associated transceivers, obtaining, collecting, or receiving (such as via wireless communication or data transmission over one or more radio frequency links) vehicle build information for multiple automobiles from computing devices associated from vehicle manufacturers, dealerships, repair shops, and/or vehicle owners, or directly from smart vehicles, autonomous vehicles, and/or other vehicles configured for wireless communication with other computing devices 502. The vehicle build information may include one or more advanced vehicle safety features (AVSFs) as described and discussed elsewhere herein.

The method 500 may include, via one or more processors and/or associated transceivers, generating and/or using an ontology module to develop a common terminology for advanced vehicle safety features (AVSFs) 504, such as described and detailed elsewhere herein. For instance, different OEMs may use different terminology for similar vehicle safety features. The ontology may convert the different terminology from the OEMs into a common vocabulary.

The method 500 may include, via one or more processors and/or associated transceivers, collecting or receiving (such as via wireless communication or data transmission from a driver or passenger mobile device or a vehicle controller/transceiver over one or more radio frequency links) (i) vehicle telematics data (associated with individual vehicle operation, such as speed, acceleration, cornering, braking, location, etc.), and/or (ii) AVSF configuration, software version, and/or usage data 506.

The AVSF configuration data may include various settings of an AVSF established or set by a vehicle owner. The AVSF software version data may include a version of software or current version of software installed on the AVSF or AVSF memory unit. The AVSF usage data may include data detailing whether and to what extent the AVSF is or was used on a given day or trip. For instance, some vehicle owners may decide not to employ or rely upon advanced vehicle safety features, while other vehicle owners may always use or employ the AVSFs available to them or installed on their vehicles.

The method 500 may include, via one or more processors, analyzing (i) the vehicle telematics data, and/or (ii) the AVSF configuration, software version, and/or usage data to determine an individual advanced vehicle safety feature performance or safety profile for AVSFs defined by the ontology 508. In one embodiment, the vehicle telematics data, and/or the AVSF configuration, software version, and/or usage data may be input into a machine learning program, module, model, or algorithm trained to determine an AVSF performance or safety profile or score based upon vehicle telematics data, and/or AVSF configuration, software version, and/or usage data. As an example, when a processor determines that an AVSF is in use, vehicle operation may be monitored to determine whether the AVSF and/or vehicle is operating or performing as expected or designed. The AVSF, and/or the safety performance thereof, may then be assigned a score and a performance profile of the AVSF updated.

In general, training the machine learning model (or neural network model) may include establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values.

In one embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction.

The method 500 may include, via one or more processors, generating a virtual report detailing each AVSF's performance and/or safety rating or score for AVSFs defined by the ontology 510. The virtual report may be shared with vehicle owners, dealerships, repair shops, and/or OEMs via a website or virtual portal. The method 500 may include additional, less, or alternate actions, including those discussed elsewhere herein.

Figure 6:
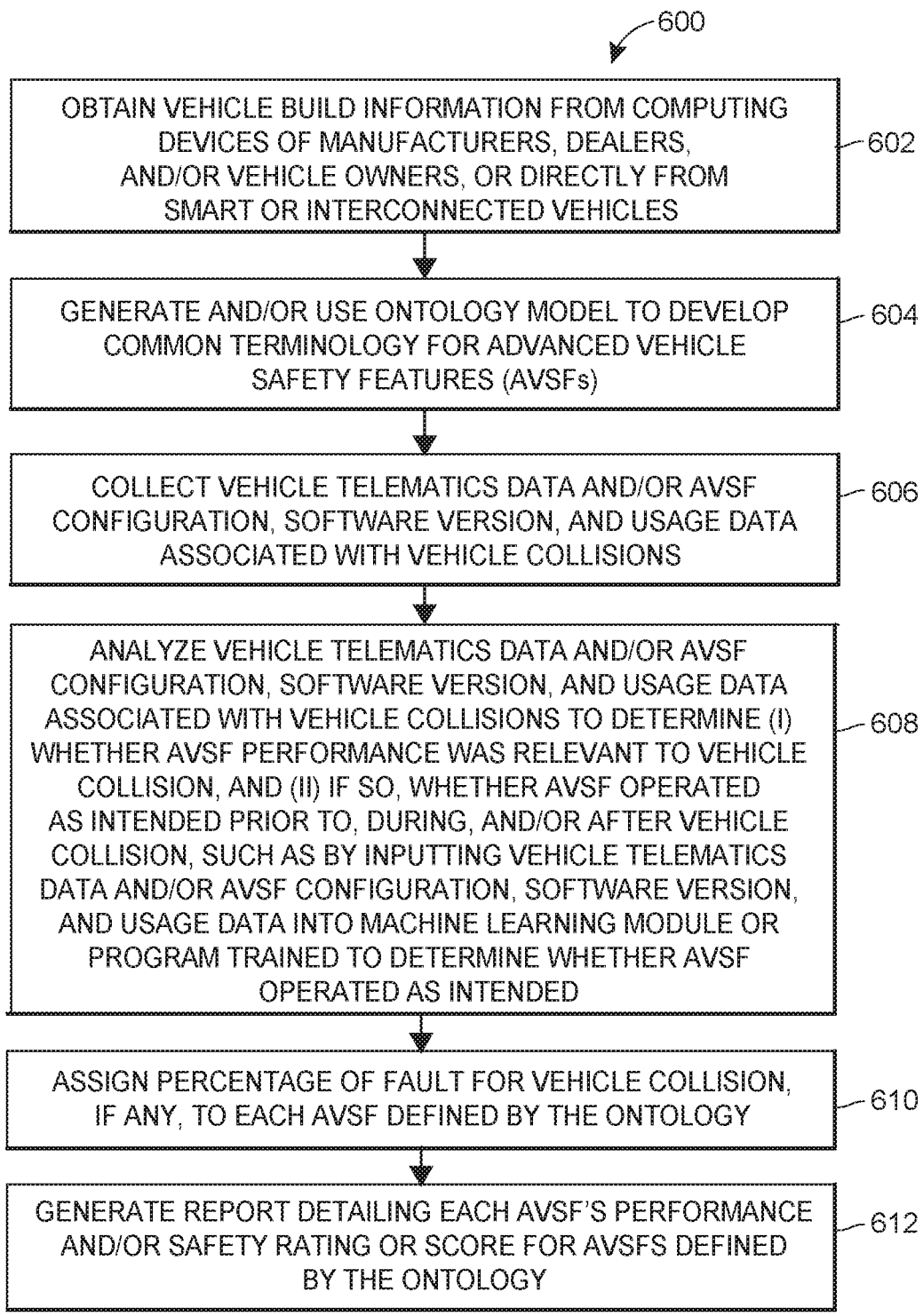
FIG. 6 illustrates another exemplary computer-implemented method of analyzing performance of advanced vehicle safety features.

FIG. 6 illustrates another exemplary computer-implemented method of analyzing performance of advanced vehicle safety features 600. The method 600 may include, via one or more processors and/or associated transceivers, obtaining, collecting, or receiving vehicle build information for multiple automobiles from computing devices associated from vehicle manufacturers, dealerships, repair shops, and/or vehicle owners, or directly from smart vehicles, autonomous vehicles, and/or other vehicles configured for wireless communication with other computing devices 602, such as described with respect to FIG. 5 above. Also as discussed with respect to FIG. 5 above, the method 600 may include, via one or more processors and/or associated transceivers, generating and/or using an ontology module to develop a common terminology for advanced vehicle safety features (AVSFs) 604.

The method 600 may include, via one or more processors and/or associated transceivers, collecting or receiving (such as via wireless communication or data transmission from a driver or passenger mobile device or a vehicle controller/transceiver over one or more radio frequency links) (i) vehicle telematics data (associated with individual vehicle operation, such as speed, acceleration, cornering, braking, location, etc.) associated with (such as collected prior to, during, and/or after) a vehicle collision, and/or (ii) AVSF configuration, software version, and/or usage data associated with (such as collected prior to, during, and/or after) a vehicle collision 606.

As noted above during the discussion of FIG. 5, the AVSF configuration data may include various settings of an AVSF established or set by a vehicle owner. The AVSF software version data may include a version of software or current version of software installed on the AVSF or AVSF memory unit. The AVSF usage data may include data detailing whether and to what extent the AVSF is or was used on a given day or trip. For instance, some vehicle owners may decide not to employ or rely upon advanced vehicle safety features, while other vehicle owners may always use or employ the AVSFs available to them or installed on their vehicles.

The method 600 may include, via one or more processors, analyzing (i) the vehicle telematics data associated with a vehicle collision, and/or (ii) the AVSF configuration, software version, and/or usage data associated with the vehicle collision to determine an individual advanced vehicle safety feature performance or safety profile for AVSFs defined by the ontology 608. In one embodiment, the vehicle telematics data associated with the vehicle collision, and/or the AVSF configuration, software version, and/or usage data associated with the vehicle collision may be input into a machine learning program, module, model, or algorithm trained to determine an AVSF performance or safety profile or score based upon vehicle telematics data associated with the vehicle, and/or AVSF configuration, software version, and/or usage data associated with the vehicle collision. As an example, when a processor determines that an AVSF is in use, vehicle operation may be monitored to determine whether the AVSF and/or vehicle is operating or performing as expected or designed prior to, during, and/or after a vehicle collision.

As an example, when a processor determines that an AVSF is in use, vehicle operation may be monitored to determine whether the performance of the AVSF was relevant to a collision. For instance, determining whether the AVSF and/or vehicle is operating or performing as expected or designed prior to, during, and/or after the vehicle collision may include inputting vehicle telematics data and/or AVSF configuration, software version, and usage data into machine learning module or program trained to determine whether the AVSF and/or vehicle is operating or performing as expected or designed. Similarly, determining whether the performance of the AVSF was relevant to the collision may include inputting vehicle telematics data and/or AVSF configuration, software version, and usage data into machine learning module or program trained to determine whether the performance of the AVSF was relevant to the collision. The AVSF, and/or the safety performance thereof, may then be assigned a score and a performance profile of the AVSF updated.

As discussed above with respect to FIG. 5, in general, training the machine learning model (or neural network model) may include establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values.

In one embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction.

The method 600 may include, via one or more processors, assigning a percentage of fault for a vehicle collision to each AVSF defined by the ontology based upon the analysis of the telematics data and AVSF data associated with the vehicle collision or collisions. After which, as discussed with FIG. 5, the method 600 may include, via one or more processors, generating a virtual report detailing each AVSF's performance and/or safety rating or score for AVSFs defined by the ontology 612. The virtual report may be shared with vehicle owners, dealerships, repair shops, and/or OEMs via a website or virtual portal. The method 600 may include additional, less, or alternate actions, including those discussed elsewhere herein.

Exemplary Advanced Vehicle Safety Feature Analysis

In one aspect, a computer-implemented method for determining the effectiveness of vehicle safety features may be provided. The method may include (1) obtaining, collecting, or receiving, by one or more processors and/or associated transceivers (such as via wireless communication or data transmission over one or more radio frequency links), vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generating or using, via the one or more processors, an ontology or ontology model to develop a common terminology for the AVSFs or one or more smart safety features; (3) collecting or receiving, via the one or more processors and/or associated transceivers (such as via wireless communication or data transmission over one or more radio frequency links), vehicle telematics data and/or AVSF data from a mobile device associated with a vehicle owner or a vehicle controller or transceiver; and/or (4) analyzing, via the one or more processors, the vehicle telematics data and/or AVSF data to determine an individual AVSF performance rating or safety score for each AVSF defined by the ontology or ontology model. The method may include additional, less, or alternate actions, including those discussed elsewhere herein.

For instance, the method may include generating a virtual report detailing the individual AVSF performance rating or safety score for each AVSF in or defined by the ontology. The method may also include publishing the virtual report or otherwise making the virtual report available via a virtual portal.

In some embodiments, the AVSF data may be AVSF configuration, software, and/or usage data. Additionally or alternatively, the AVSF data may include or detail vehicle owner preferences for AVSF configurations and usage. The AVSF data may include software version information of a current software version installed or executing on the AVSF. The AVSF may be an autonomous or semi-autonomous vehicle feature, technology, or system.

The vehicle telematics data may include speed, acceleration, cornering, braking, location, and time of day information. Analyzing, via the one or more processors, the vehicle telematics data and/or AVSF data to determine an individual AVSF performance rating or safety score may include inputting the vehicle telematics data and/or AVSF data into a machine learning program, module, model, or algorithm trained to generate an AVSF performance rating or safety score based upon vehicle telematics data and/or AVSF data.

In another aspect, a computer system configured to determine the effectiveness of vehicle safety features may be provided. The computer system may include one or more processors, servers, and/or associated transceivers configured to: (1) obtain, collect, or receive, such as via wireless communication or data transmission over one or more radio frequency links, vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generate or use an ontology or ontology model to develop a common terminology for the AVSFs or one or more smart safety features; (3) collect or receive, such as via wireless communication or data transmission over one or more radio frequency links, vehicle telematics data and/or AVSF data from a mobile device associated with a vehicle owner or a vehicle controller or transceiver; and/or (4) analyze the vehicle telematics data and/or AVSF data to determine an individual AVSF performance rating or safety score for each AVSF defined by the ontology or ontology score.

The one or more processors may be further configured to generate a virtual report detailing the individual AVSF performance rating or safety score for each AVSF in or defined by the ontology. The one or more processors may be configured to input the vehicle telematics data and/or AVSF data into a machine learning program, module, model, or algorithm trained to generate an AVSF performance rating or safety score based upon vehicle telematics data and/or AVSF data. The computer system may include additional, less, or alternate functionality, including that discussed elsewhere herein.

In another aspect, a computer-implemented method for determining the effectiveness of vehicle safety features may be provided. The method may include (1) obtaining, collecting, or receiving, by one or more processors and/or associated transceivers (such as via wireless communication or data transmission over one or more radio frequency links), vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generating or using, via the one or more processors, an ontology or ontology model to develop a common terminology for the AVSFs or one or more smart safety features; (3) collecting or receiving, via the one or more processors and/or associated transceivers (such as via wireless communication or data transmission over one or more radio frequency links), vehicle telematics data associated with a vehicle collision and/or AVSF data associated with the vehicle collision, such as from a mobile device associated with a vehicle owner or a vehicle controller or transceiver; and/or (4) analyzing, via the one or more processors, the vehicle telematics data associated with the vehicle collision and/or AVSF data associated with the vehicle collision to determine an individual AVSF performance rating or safety score for each AVSF defined by the ontology or ontology model.

The method may include generating a virtual report detailing the individual AVSF performance rating or safety score for each AVSF in or defined by the ontology. The method may include inputting the vehicle telematics data associated with the vehicle collision and/or AVSF data associated with the vehicle collision into a machine learning program, module, model, or algorithm trained to generate an AVSF performance rating or safety score based upon vehicle telematics data and/or AVSF data. The vehicle telematics data and/or AVSF data may be generated or collected before, during, and/or after a vehicle collision. The method may include additional, less, or alternate actions, including those discussed elsewhere herein.

In another aspect, a computer system configured to determine the effectiveness of vehicle safety features may be provided. The computer system may include one or more processors, servers, and/or associated transceivers configured to: (1) obtain, collect, or receive, such as via wireless communication or data transmission over one or more radio frequency links, vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generate or use an ontology or ontology model to develop a common terminology for the AVSFs or one or more smart safety features; (3) collect or receive, such as via wireless communication or data transmission over one or more radio frequency links, vehicle telematics data associated with the vehicle collision and/or AVSF data associated with the vehicle collision, such as from a mobile device associated with a vehicle owner or a vehicle controller or transceiver; and/or (4) analyze the vehicle telematics data associated with the vehicle collision and/or AVSF data associated with the vehicle collision to determine an individual AVSF performance rating or safety score. The computer system may be configured to input the vehicle telematics data and/or AVSF data into a machine learning program, module, model, or algorithm trained to generate an AVSF performance rating or safety score based upon vehicle telematics data and/or AVSF data. The computer system may include additional, less, or alternate functionality, including that discussed elsewhere herein.

Additional Considerations

Although the foregoing text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method for determining the effectiveness of vehicle safety features, the method comprising:
   obtaining, by a processor, vehicle build information for a plurality of vehicles manufactured by a plurality of original equipment manufacturers (OEMs), the vehicle build information containing OEM-specific terminology associated with one or more smart safety features associated with each vehicle;
   analyzing, by a processor, obtained vehicle build information to generate an ontology model mapping each smart safety feature to any OEM-specific terminology associated with the smart safety feature for each OEM;
   applying, by a processor, the ontology model to the vehicle build information to generate translated vehicle build information for each of the plurality of vehicles, such that the OEM-specific terminology associated with each smart safety feature is replaced with OEM-agnostic terminology for the smart safety feature;
   obtaining, by a processor, vehicle accident record information for each of the plurality of vehicles, wherein the vehicle accident record information includes one or more of a number of accidents, a frequency of accidents, or a severity of accidents associated with each of the plurality of vehicles; and
   calculating, by a processor, using the OEM-agnostic terminology for each smart safety feature associated with each of the plurality of vehicles and the vehicle accident record information for each of the plurality of vehicles, an effectiveness score associated with each smart safety feature.

2. The computer-implemented method of claim 1, wherein analyzing the obtained vehicle build information to generate an ontology model mapping each smart safety feature to OEM-specific terminology associated with the smart safety feature for each OEM comprises:
   training, by a processor, a machine learning model using OEM-specific terminology associated with each of a plurality of known smart safety features for a plurality of OEMs; and
   applying, by a processor, the trained machine learning model to the obtained vehicle build information in order to identify OEM-specific terminology associated with each smart safety feature for each OEM.

3. The computer-implemented method of claim 1, further comprising:
   determining, by a processor, an insurance rating for a particular vehicle based upon an effectiveness score associated with each smart safety feature associated with the particular vehicle.

4. The computer-implemented method of claim 1, further comprising:
   obtaining, by a processor, vehicle telematics data for each of the plurality of vehicles; and
   determining, by a processor, based upon the vehicle telematics data for each of the plurality of vehicles and the vehicle accident record information for each of the plurality of vehicles, that a smart safety feature associated with a vehicle was deactivated at a date and/or time of an accident associated with the vehicle; and
   wherein calculating the effectiveness score associated with the smart safety feature is further based upon the determination that the smart safety feature associated with the vehicle was deactivated at a date and/or time of an accident associated with the vehicle.

5. The computer-implemented method of claim 1, further comprising:
   obtaining, by a processor, vehicle telematics data for each of the plurality of vehicles; and
   determining, by a processor, based upon the vehicle telematics data for each of the plurality of vehicles and the vehicle accident record information for each of the plurality of vehicles, that a smart safety feature associated with a vehicle was activated at a date and/or time of an accident associated with the vehicle; and
   wherein calculating the effectiveness score associated with the smart safety feature is further based upon the determination that the smart safety feature associated with the vehicle was activated at a date and/or time of an accident associated with the vehicle.

6. The computer-implemented method of claim 1, further comprising:
   obtaining, by a processor, vehicle telematics data for each of the plurality of vehicles, the vehicle telematics data including data associated with one or more a road upon which the vehicle is operating or an environment in which the vehicle is operating; and
   determining, by a processor, based upon the vehicle telematics data for each of the plurality of vehicles and the vehicle accident record information for each of the plurality of vehicles, that a smart safety feature associated with a vehicle was activated at a date and/or time of an accident associated with the vehicle; and
   wherein calculating the effectiveness score associated with the smart safety feature is further based upon the determination that the smart safety feature associated with the vehicle was activated at a date and/or time of an accident associated with the vehicle, an operational design domain of the safety feature, and the road upon which the vehicle was operating and/or the environment in which the vehicle was operating at the date and/or time of the accident.

7. The computer-implemented method of claim 1, further comprising:
   receiving, by a processor, an indication that a smart safety feature associated with a vehicle had been updated prior to a date and/or time of an accident associated with the vehicle; and
   wherein calculating the effectiveness score associated with the smart safety feature is further based upon the indication that the smart safety feature associated with the vehicle had been updated prior to the date and/or time of the accident associated with the vehicle.

8. The computer-implemented method of claim 1, further comprising:
   calculating, using the OEM-agnostic terminology for each smart safety feature associated with each of the plurality of vehicles and the vehicle accident record information for each of the plurality of vehicles, an effectiveness score associated with a particular combination of smart safety features.

9. A computer system for determining the effectiveness of vehicle safety features, comprising:
   one or more processors; and
   a non-transitory program memory communicatively coupled to the one or more processors and storing executable instructions that, when executed by the one or more processors, cause the computer system to:
     obtain vehicle build information for a plurality of vehicles manufactured by a plurality of original equipment manufacturers (OEMs), the vehicle build information containing OEM-specific terminology associated with one or more smart safety features associated with each vehicle;

analyze obtained vehicle build information to generate an ontology model mapping each smart safety feature to any OEM-specific terminology associated with the smart safety feature for each OEM;

apply the ontology model to the vehicle build information to generate translated vehicle build information for each of the plurality of vehicles, such that the OEM-specific terminology associated with each smart safety feature is replaced with OEM-agnostic terminology for the smart safety feature;

obtain vehicle accident record information for each of the plurality of vehicles, wherein the vehicle accident record information includes one or more of a number of accidents, a frequency of accidents, or a severity of accidents associated with each of the plurality of vehicles; and calculate, using the OEM-agnostic terminology for each smart safety feature associated with each of the plurality of vehicles and the vehicle accident record information for each of the plurality of vehicles, an effectiveness score associated with each smart safety feature.

10. The computer system of claim 9, wherein the instructions, when executed by the one or more processors, cause the computer system to analyze the obtained vehicle build information to generate an ontology model mapping each smart safety feature to OEM-specific terminology associated with the smart safety feature for each OEM by:

training a machine learning model using OEM-specific terminology associated with each of a plurality of known smart safety features for a plurality of OEMs; and applying the trained machine learning model to the obtained vehicle build information in order to identify OEM-specific terminology associated with each smart safety feature for each OEM.

11. The computer system of claim 9, wherein the instructions, when executed by the one or more processors, cause the computer system to:

determine an insurance rating for a particular vehicle based upon an effectiveness score associated with each smart safety feature associated with the particular vehicle.

12. The computer system of claim 9, wherein the instructions, when executed by the one or more processors, cause the computer system to:

obtain vehicle telematics data for each of the plurality of vehicles; and determine, based upon the vehicle telematics data for each of the plurality of vehicles and the vehicle accident record information for each of the plurality of vehicles, that a smart safety feature associated with a vehicle was deactivated at a date and/or time of an accident associated with the vehicle, and wherein the instructions, when executed by the one or more processors, cause the computer system to calculate the effectiveness score associated with the smart safety feature further based upon the determination that the smart safety feature associated with the vehicle was deactivated at a date and/or time of an accident associated with the vehicle.

13. The computer system of claim 9, wherein the instructions, when executed by the one or more processors, cause the computer system to:

obtain vehicle telematics data for each of the plurality of vehicles; and determine, based upon the vehicle telematics data for each of the plurality of vehicles and the vehicle accident record information for each of the plurality of vehicles, that a smart safety feature associated with a vehicle was activated at a date and/or time of an accident associated with the vehicle; and wherein the instructions, when executed by the one or more processors, cause the computer system to calculate the effectiveness score associated with the smart safety feature further based upon the determination that the smart safety feature associated with the vehicle was activated at a date and/or time of an accident associated with the vehicle.

14. The computer system of claim 9, wherein the instructions, when executed by the one or more processors, cause the computer system to:

obtain vehicle telematics data for each of the plurality of vehicles, the vehicle telematics data including data associated with one or more a road upon which the vehicle is operating or an environment in which the vehicle is operating; and determine, based upon the vehicle telematics data for each of the plurality of vehicles and the vehicle accident record information for each of the plurality of vehicles, that a smart safety feature associated with a vehicle was activated at a date and/or time of an accident associated with the vehicle; and wherein calculating the effectiveness score associated with the smart safety feature is further based upon the determination that the smart safety feature associated with the vehicle was activated at a date and/or time of an accident associated with the vehicle, an operational design domain of the safety feature, and the road upon which the vehicle was operating and/or the environment in which the vehicle was operating at the date and/or time of the accident.

15. The computer system of claim 9, wherein the instructions, when executed by the one or more processors, cause the computer system to:

receive an indication that a smart safety feature associated with a vehicle had been updated prior to a date and/or time of an accident associated with the vehicle, and wherein the instructions, when executed by the one or more processors, cause the computer system to calculate the effectiveness score associated with the smart safety feature further based upon the indication that the smart safety feature associated with the vehicle had been updated prior to the date and/or time of the accident associated with the vehicle.

16. The computer system of claim 9, wherein the instructions, when executed by the one or more processors, cause the computer system to:

calculate, using the OEM-agnostic terminology for each smart safety feature associated with each of the plurality of vehicles and the vehicle accident record information for each of the plurality of vehicles, an effectiveness score associated with a particular combination of smart safety features.

17. A tangible, non-transitory computer-readable medium storing executable instructions for determining the effectiveness of vehicle safety features that, when executed by at least one processor of a computer system, cause the computer system to:

obtain vehicle build information for a plurality of vehicles manufactured by a plurality of original equipment manufacturers (OEMs), the vehicle build information containing OEM-specific terminology associated with one or more smart safety features associated with each vehicle;

analyze obtained vehicle build information to generate an ontology model mapping each smart safety feature to any OEM-specific terminology associated with the smart safety feature for each OEM;

apply the ontology model to the vehicle build information to generate translated vehicle build information for each of the plurality of vehicles, such that the OEM-specific terminology associated with each smart safety feature is replaced with OEM-agnostic terminology for the smart safety feature;

obtain vehicle accident record information for each of the plurality of vehicles, wherein the vehicle accident record information includes one or more of a number of accidents, a frequency of accidents, or a severity of accidents associated with each of the plurality of vehicles; and calculate, using the OEM-agnostic terminology for each smart safety feature associated with each of the plurality of vehicles and the vehicle accident record information for each of the plurality of vehicles, an effectiveness score associated with each smart safety feature.

18. The tangible, non-transitory computer-readable medium of claim 17, wherein the instructions, when executed by the at least one processor, cause the computer system to analyze the obtained vehicle build information to generate an ontology model mapping each smart safety feature to OEM-specific terminology associated with the smart safety feature for each OEM by:

training a machine learning model using OEM-specific terminology associated with each of a plurality of known smart safety features for a plurality of OEMs; and applying the trained machine learning model to the obtained vehicle build information in order to identify OEM-specific terminology associated with each smart safety feature for each OEM.

19. The tangible, non-transitory computer-readable medium of claim 17, wherein the instructions, when executed by the at least one processor, cause the computer system to:

determine an insurance rating for a particular vehicle based upon an effectiveness score associated with each smart safety feature associated with the particular vehicle.

20. The tangible, non-transitory computer-readable medium of claim 17, wherein the instructions, when executed by the at least one processor, cause the computer system to:

obtain vehicle telematics data for each of the plurality of vehicles; and determine, based upon the vehicle telematics data for each of the plurality of vehicles and the vehicle accident record information for each of the plurality of vehicles, that a smart safety feature associated with a vehicle was deactivated at a date and/or time of an accident associated with the vehicle, and wherein the instructions, when executed by the at least one processor, cause the computer system to calculate the effectiveness score associated with the smart safety feature further based upon the determination that the smart safety feature associated with the vehicle was deactivated at a date and/or time of an accident associated with the vehicle.

\* \* \* \* \*